(12) United States Patent
Parry

(10) Patent No.: US 10,503,763 B2
(45) Date of Patent: Dec. 10, 2019

(54) METHODS AND SYSTEMS FOR EXECUTING FUNCTIONS IN A TEXT FIELD

(71) Applicant: FACEBOOK, INC., Menlo Park, CA (US)

(72) Inventor: John Chad Parry, Issaquah, WA (US)

(73) Assignee: FACEBOOK, INC., Menlo Park, CA (US)

( * ) Notice: Subject to any disclaimer, the term of this patent is extended or adjusted under 35 U.S.C. 154(b) by 234 days.

(21) Appl. No.: 15/352,446

(22) Filed: Nov. 15, 2016

(65) Prior Publication Data

US 2018/0136803 A1    May 17, 2018

(51) Int. Cl.
*G06F 3/0484* (2013.01)
*G06F 3/0482* (2013.01)
*G06F 17/24* (2006.01)
*G06F 17/30* (2006.01)
*G06F 16/33* (2019.01)

(52) U.S. Cl.
CPC .................... *G06F 16/33* (2019.01)

(58) Field of Classification Search
CPC ................ G06F 3/0484; G06F 3/0482; G06F 17/30634; G06F 17/24
See application file for complete search history.

(56) References Cited

U.S. PATENT DOCUMENTS

| 8,949,357 | B2 * | 2/2015 | Bradshaw | G06Q 50/01 709/206 |
| 9,857,190 | B2 * | 1/2018 | Marueli | G01C 21/3484 |
| 2002/0194188 | A1 * | 12/2002 | Ostermann | G11B 27/005 |
| 2003/0033293 | A1 * | 2/2003 | Cheng | G06F 16/90339 |
| 2005/0010824 | A1 * | 1/2005 | Yuan | H04L 63/08 726/19 |
| 2006/0106769 | A1 * | 5/2006 | Gibbs | G06F 17/276 |
| 2007/0083408 | A1 * | 4/2007 | Altberg | G06Q 30/02 705/14.69 |
| 2007/0271255 | A1 * | 11/2007 | Pappo | G06F 16/951 |
| 2008/0052277 | A1 * | 2/2008 | Lee | G06F 16/3322 |
| 2008/0228685 | A1 * | 9/2008 | Shivaji-Rao | G06F 9/451 706/46 |
| 2008/0301177 | A1 * | 12/2008 | Doherty | G06F 16/951 |
| 2009/0187561 | A1 * | 7/2009 | Park | G06F 16/3326 |
| 2010/0036862 | A1 * | 2/2010 | Das | G06F 16/2255 707/698 |
| 2011/0115722 | A1 * | 5/2011 | Mok | G06F 3/016 345/173 |
| 2011/0178831 | A1 * | 7/2011 | Ravichandran | G06Q 10/06 705/7.11 |
| 2012/0150793 | A1 * | 6/2012 | Carroll | G06F 21/10 707/602 |

(Continued)

*Primary Examiner* — Daeho D Song

(74) *Attorney, Agent, or Firm* — Morgan, Lewis & Bockius LLP

(57) ABSTRACT

Methods, systems, and/or devices for executing functions in a text field are described. In some embodiments, a method may comprise displaying a field in an application running on a client device and accepting entry of text containing a predefined combination of characters followed by a keyword into the field, where the keyword corresponds to a function to be performed. A user-interface element based on the text is displayed and requests user input regarding the function. The user input is received and the function is performed in accordance with the input.

15 Claims, 14 Drawing Sheets

(56) References Cited

U.S. PATENT DOCUMENTS

| | | | |
|---|---|---|---|
| 2012/0180073 A1* | 7/2012 | Hung | G06F 16/9566 719/313 |
| 2013/0053007 A1* | 2/2013 | Cosman | G06F 3/017 455/414.3 |
| 2013/0074168 A1* | 3/2013 | Hao | H04L 9/3213 726/7 |
| 2013/0097143 A1* | 4/2013 | Shenoy | G06F 16/9535 707/706 |
| 2013/0110946 A1* | 5/2013 | Bradshaw | H04L 12/6418 709/206 |
| 2013/0159462 A1* | 6/2013 | Saiki | H04L 67/32 709/217 |
| 2013/0290205 A1* | 10/2013 | Bonmassar | G06Q 10/1053 705/321 |
| 2013/0290207 A1* | 10/2013 | Bonmassar | G06Q 10/06 705/321 |
| 2014/0082550 A1* | 3/2014 | Farmer | G06F 16/332 715/781 |
| 2014/0164352 A1* | 6/2014 | Denninghoff | H03H 9/02622 707/711 |
| 2015/0004943 A1* | 1/2015 | Park | H04M 3/42357 455/412.1 |
| 2015/0143475 A1* | 5/2015 | Song | H04L 63/08 726/4 |
| 2015/0317323 A1* | 11/2015 | Wang | G06F 16/9014 707/747 |
| 2015/0334080 A1* | 11/2015 | Tamayo | H04L 67/10 709/203 |
| 2016/0098157 A1* | 4/2016 | Kim | G06F 3/167 715/738 |
| 2017/0011127 A1* | 1/2017 | Hu | G06F 16/9535 |
| 2017/0220676 A1* | 8/2017 | Kang | G06F 16/90328 |
| 2017/0293617 A1* | 10/2017 | Wang | G06F 16/51 |
| 2018/0052934 A1* | 2/2018 | Li | G06F 16/5866 |
| 2018/0089283 A1* | 3/2018 | Indyk | G06Q 10/067 |

\* cited by examiner

METHODS AND SYSTEMS FOR EXECUTING FUNCTIONS IN A TEXT FIELD

TECHNICAL FIELD

The disclosed implementations relate generally to social media services, and, in particular, to permitting execution of functions from within a text field.

BACKGROUND

Interactive services, such as social media services, allow users to interact with the services and potentially other users of the services. Sometimes, these interactions involve allowing users to perform various writing tasks such as posting pictures or news articles, providing status updates, making or replying to comments about a user's posts, etc. Users access these services through devices running, for example, web browser applications, or applications specific to the interactive service.

When a user is interacting with a service, the user sometimes needs to obtain additional information to complete his or her writing task. For example, if a user is commenting on a news article, the user may wish to look up information related to that article. The user may similarly wish to correct the spelling and/or grammar of a user who previously commented, but may wish to confirm the correct spelling and/or grammar, or may wish to have the correct spelling and/or grammar automatically generated to ensure its correctness. Similarly, in the case of social media services, a user may wish to introduce themselves to another user, but may not know how to write the introduction.

Traditionally, users would go to other sources to obtain this information. For example, a user accessing an interactive media service though a web browser may go to another website to look up conversation starters or the correct spelling of a word. However, some interactive services earn more money based on the time users spend on the services' sites. For example, some services may charge a fee based on the time a user is on the service. Some services are free, but display advertisements to the users. For these services, when the user is not directly using the service, the user is not viewing the advertisements, potentially resulting in lost review for the interactive service. Accordingly, even if the user is on another website or service for assistance in performing a task on the interactive service, the interactive service is not earning revenue while the user is on the other website or service. Additionally, for users who access interactive sites via custom applications, it may be difficult to access another site to obtain information such as spelling and, depending on the application, the user may have to close the application to do so.

Some interactive services use content generated by one user to attract and retain other users. For example, an interactive service may show a comment written by a first user to a second user in hopes that the second user will respond to it, thus triggering yet another response back from the first user (or a third user). Often, due to the nature of social constructs, these user interactions take place over a relatively short period of activity. Otherwise, a topic may go "stale" and a user, who may have responded earlier, may forgo responding after the topic goes stale. When a user, such as the second user in the example above, would like to comment on another user's post or comment, but has to leave the interactive service to research information to complete their comment, delay is introduced. Further, during that delay period, the first user may become distracted and be less inclined to respond to the second user. Further, the second user, while off the service, may become distracted and not return to the interactive service, resulting in the comment never being posted. Similarly, if a user has to interrupt a half-performed task, such as a half-written post, to look up information on another system, the user may choose to cancel the task completely, preventing, for example, the post from being made available for other users to comment on.

SUMMARY

Accordingly, there is a need for a user of an interactive service to be able to execute functions, both internal to the service and external to it, while completing tasks on the service. Further, there is a need to allow users to perform those functions without having to suspend their writing tasks and without having to directly access other services.

In accordance with some embodiments, a method is performed at a client device with one or more processors and memory storing instructions for execution by the one or more processors. The method includes displaying a field in an application running on the client device. The method further comprises accepting entry of text into the field, where the text includes a predefined combination of characters followed by a keyword. The predefined combination of characters indicates that the keyword corresponds to a function to be performed. The method further comprises displaying a user-interface element based on the text. The user-interface element requests user input regarding the function. The method comprises receiving the user input and performing the function in accordance with that input.

In accordance with some implementations, a client device includes one or more processors and memory storing one or more programs configured to be executed by the one or more processors. In some embodiments, the client device will interact with a server. The one or more programs include instructions for performing the operations of the method described above. In accordance with some implementations, a non-transitory computer-readable storage medium has stored therein instructions that, when executed by a client device, cause the client device to perform the operations of the method described above.

Thus, client-device users are provided with efficient, user-friendly methods for executing functions while performing tasks such as posting or commenting.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to obscure aspects of the implementations unnecessarily.

It will also be understood that, although the terms first, second, etc. are, in some instances, used herein to describe various elements, these elements should not be limited by these terms. These terms are used only to distinguish one element from another.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
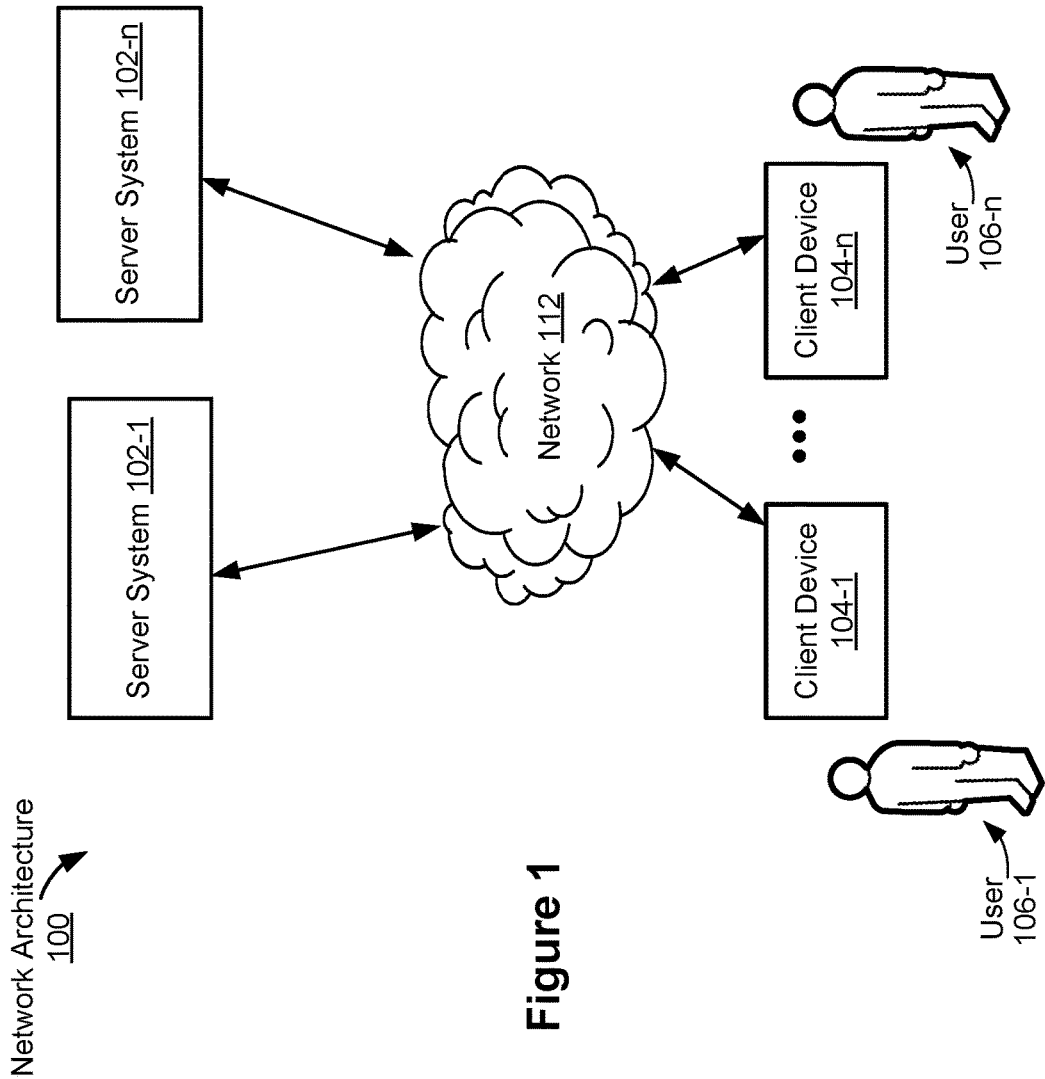
FIG. 1 is a block diagram illustrating an exemplary network architecture in accordance with some implementations.

FIG. 1 is a block diagram illustrating an exemplary network architecture 100 in accordance with some implementations. The network architecture 100 includes one or more clients 104-1 . . . 104-n (where n is an integer greater than or equal to one) and one or more server systems 102. One or more networks 112 communicably connect each component of the network architecture 100 with other components of the network architecture 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

A client 104 (e.g. 104-1, 104-2, . . . 104-n) is associated with one or more users 106 (e.g., 106-1, 106-2, . . . 106-n). In some implementations, a client 104 is a personal computer, a mobile electronic device, a wearable computing device, a laptop, a tablet computer, a mobile phone, a feature phone, a smart phone, a digital media player, or any other device capable of capturing and/or transmitting data. In some implementations, clients 104 include input devices 208 for receiving user inputs (e.g., keyboards or mice for receiving a first version and a second version of an API and/or an application name, which the clients may store and/or transmit to other components of the network architecture 100, such as the server system 102). Clients 104 may be the same type of device (e.g., all mobile devices), or may comprise different types of devices.

Users 106 employ clients 104 to execute functions based on entering a predefined combination of characters followed by a keyword. In some embodiments, functions may be executed entirely on the clients 104. In some such embodiments, the client 104 may not be connected to a network 112 or may be disconnected from the network 112 temporarily.

In some embodiments, the clients 104 will send a function request to a server system 102, which will perform the requested function and the client will display the result. For example, the request may ask the server to return an image, such as a map. In some embodiments, the server system 102 (e.g., a server 102-1) will, in response to receiving the request, send a second request to a second server (e.g., a server 102-2) to perform a function. For example, the user 106 of client 104 may request that a message being composed on one social media service also be posted on a second social media service. In response to the entering of the predefined combination of characters and a keyword (e.g., "#!post"), the client 104 may send a function to a first server associated with the service the user is using, which may then send a request to the second social media service on the second server. The clients 104 may access the server systems 102 through various means via network 112. For example, in some embodiments, a client 104 executes a web browser application that can be used to access a social media service hosted by the server system 102. For another example, in some embodiments, the client 104 may execute a software application that is specific to the social media service (e.g., an "app" running on a smart phone, tablet, or other device).

In some embodiments, the server system 102 stores and provides content (via the network(s) 112) to the users 106 via the client 104. Content stored and served by the server system 102, in some implementations, includes lists of functions, user data, and content necessary to perform the functions. For example, for a function to display a list of possible conversation starts, the server may store potential ways to start a conversation.

The description of the server system 102 as a "server" is intended as a functional description of the devices, systems, processors, and/or other components that provide the functionality attributed to the server system 102. It will be understood that the server system 102 may be a single server computer or multiple server computers. The server system 102 may be coupled to other servers and/or server systems, or other devices, such as other user devices, databases, content delivery networks (e.g., peer-to-peer networks), network caches, and the like. In some embodiments, the server 102 may communicate with other, unaffiliated, servers. In some implementations, the server system 102 is implemented by multiple computing devices working together to perform the actions of a server system (e.g., cloud computing). Furthermore, any functionalities performed by the server system 102 may also be performed additionally, alternatively, and/or concurrently by the one or more clients 104. For example, some keyword functions may be fully executable on a client device 104 without the need to communicate with a server 102.

Clients 104 and the server system 102 may be communicably coupled in a variety of ways. In some implementations, multiple clients 104 send requests to perform various functions to a server system 102 via a network 112. In response to receiving the requests, the server system 102 may return the requested information to the client 104.

Figure 2:
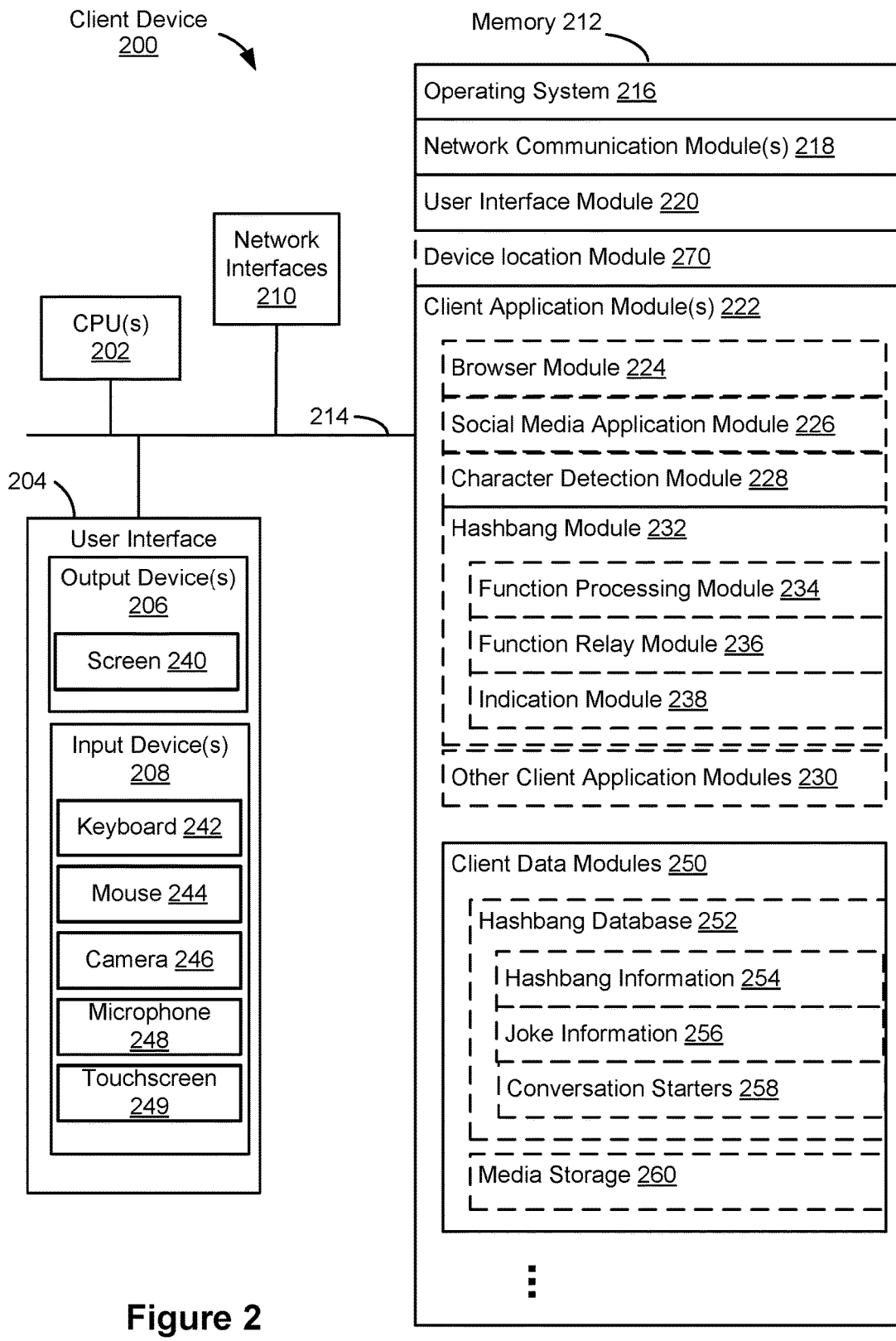
FIG. 2 is a block diagram illustrating an exemplary client in accordance with some implementations.

FIG. 2 is a block diagram illustrating an exemplary client 200 (e.g., 104-1 . . . 104-n, FIG. 1) in accordance with some implementations. The client 200 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client 200 typically includes a user interface 204, including output device(s) 206 and input device(s) 208. In some embodiments, output devices 206 comprise a screen 240 or speakers. In some implementations, the input devices 208 include one or more of a keyboard 242, mouse 244, camera 246, microphone 248, or touchscreen 249. Alternatively, or in addition, the user interface 240 may include a display device that may include a touch-sensitive surface, in which case the screen 240 may also comprise a touch-sensitive display 249 (e.g., a "touchscreen"). In user devices that have a touch-sensitive display 249, a physical keyboard is optional (e.g., a soft keyboard may be displayed when keyboard entry is needed). Furthermore, some user devices 102 may use microphone 248 and a voice recognition device to supplement or replace the keyboard 242.

In some implementations, the one or more network interfaces 210 include wireless and/or wired interfaces for receiving data from and/or transmitting data to a server system 102 and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, in some implementations, the one or more network interfaces 210 includes a wireless LAN (WLAN) interface for enabling data communications with the server system 104 (via the one or more network(s) 112, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- a device location module 270 for determining the location of the device;
- network communication module(s) 218 for connecting the client 104 to other computing devices (e.g., server system 102) via the one or more network interface(s) 210 (wired or wireless);
- a user interface module 220 that receives commands and/or inputs from a user 106 via the user interface 204 (e.g., from input devices 208), and provides outputs for display by the user interface 204 (e.g., the output devices 206); and
- one or more client application modules 222, including the following modules (or sets of instructions), or a subset or superset thereof:
  - a web browser module 224 (e.g., Internet Explorer or Edge by Microsoft, Firefox by Mozilla, Safari by Apple, or Chrome by Google) for accessing, viewing, and interacting with web sites (e.g., a social-networking web site provided by the server system 102),
  - a social media application module 226 for allowing a user 106 to access a social media system;
  - a character detection module 228, to detect the presence of the predefined characters;
  - a hashbang module 232 for receiving and processing functions requested through the specification of predefined character strings, in some embodiments comprising:
    - a function processing module 234, which processes the various functions requested;
    - a function relay module 236, which relays certain functions to a server 102; and
    - an indication module 238, which provides indications of the status or results of functions;
  - one or more client data module(s) 250 for handling the storage of and access to content, including but not limited to:
    - a hashbang database 234, which contains data related to various functions performed by the hashbang module 232; and
    - media storage 260, for storing audio, video, and images;
  - other optional client application module(s) 230, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support.

The optional device location module 270 functions to determine the location of the client device 200. This module may comprise network location services provided by a carrier (e.g., Sprint, Verizon, AT&T, or T-Mobile), satellite location services (e.g., the Global Positioning System (GPS), GLONASS, Galileo, and BeiDou), or WiFi Positioning Systems (WiPS), etc. In some implementations, multiple location services may be used. As discussed with respect to FIG. 5, below, in some embodiments, hashbang module 232 may use device location module 270 to determine the location of a client device 200, such as when a particular function requires a location and one is not specified by a user 106.

The optional hashbang module 232 provides functions for receiving and processing requests to execute functions. These requests are generally of the form of a predefined set of characters followed by a keyword specifying the function. In some embodiments, carrier detection module 228 detects the presence of the command within the text field and calls function processing module 234 on hashbang module 232. In some embodiments, the function processing module 234 processes the functions and generates responses. In some embodiments, the function requires executing a second function on a server, and function relay module 320 communicates with the server, such as though network interfaces 210 and network(s) 112 (FIG. 1). In some embodiments, indication module provides indications of the status or the results of functions to other client application modules 230.

The optional hashbang database 252 stores data associated with hashbang identifiers or functions in one or more types of databases, such as text, graph, dimensional, flat, hierarchical, network, object-oriented, relational, distributed, and/or XML, databases. In some embodiments, hashbang database 252 may be accessed publically. In other embodiments, hashbang database 252 may only be accessed by hashbang module 232 and/or other client application modules 230. In some embodiments, hashbang database 252 contains hashbang information 254, joke information 256, or conversation starters 258, among others.

In some embodiments, hashbang information 254 comprises a list of potential functions that can be executed on the client 200. In addition to providing the hashbang codes, it may list descriptions of these codes, proper syntax, and other information necessary to use them. Hashbang information 254 may also comprise function calls and other information necessary to execute the function. In some embodiments, hashbang information 254 may comprise user access data, allowing hashbang module 232 to restrict access to certain functions to certain users 106.

In some embodiments, joke information 256 comprises jokes that may be useful to a user composing a message on a social media system. In some embodiments, joke information 256 may also contain a rating for the jokes based on the respective joke's level of funniness and also based on explicit content. In some embodiments, this will comprise an age restriction.

In some embodiments, conversation starters 258 comprise phrases that may be useful to a user 106 composing an opening message to another user 106. In some embodiments, conversation starters 258 contains meta-data about the phrases to allow them to be properly selected. For example, a certain phrase may be more appropriate when said between two users 106 for whom a social media service (or an application, such as social media application module 226) has determined to be colleagues, while another phrase may be more appropriate when the social media service has determined that the two users 106 are classmates.

Media storage 260 stores audio, video, and image files for use by the various server modules, including hashbang module 232. It may comprise one or more types of databases, such as text, graph, dimensional, flat, hierarchical, network, object-oriented, relational, distributed, and/or XML databases. In some embodiments, media storage 260 may be accessed publically. In other embodiments, media storage 260 may be accessed only by hashbang module 232 and/or other client application modules 222.

Although FIG. 2 illustrates the client 200 in accordance with some implementations, FIG. 2 is intended more as a functional description of the various features that may be present in one or more clients 200 than as a structural schematic of the implementations described herein. In practice, items shown separately could be combined and some items could be separated. For example, some items shown separately in FIG. 2 could be implemented in single applications and single items could be implemented by one or more applications. The actual number of applications used to implement the client 200, and how features are allocated among them, will vary from one implementation to another.

Figure 3:
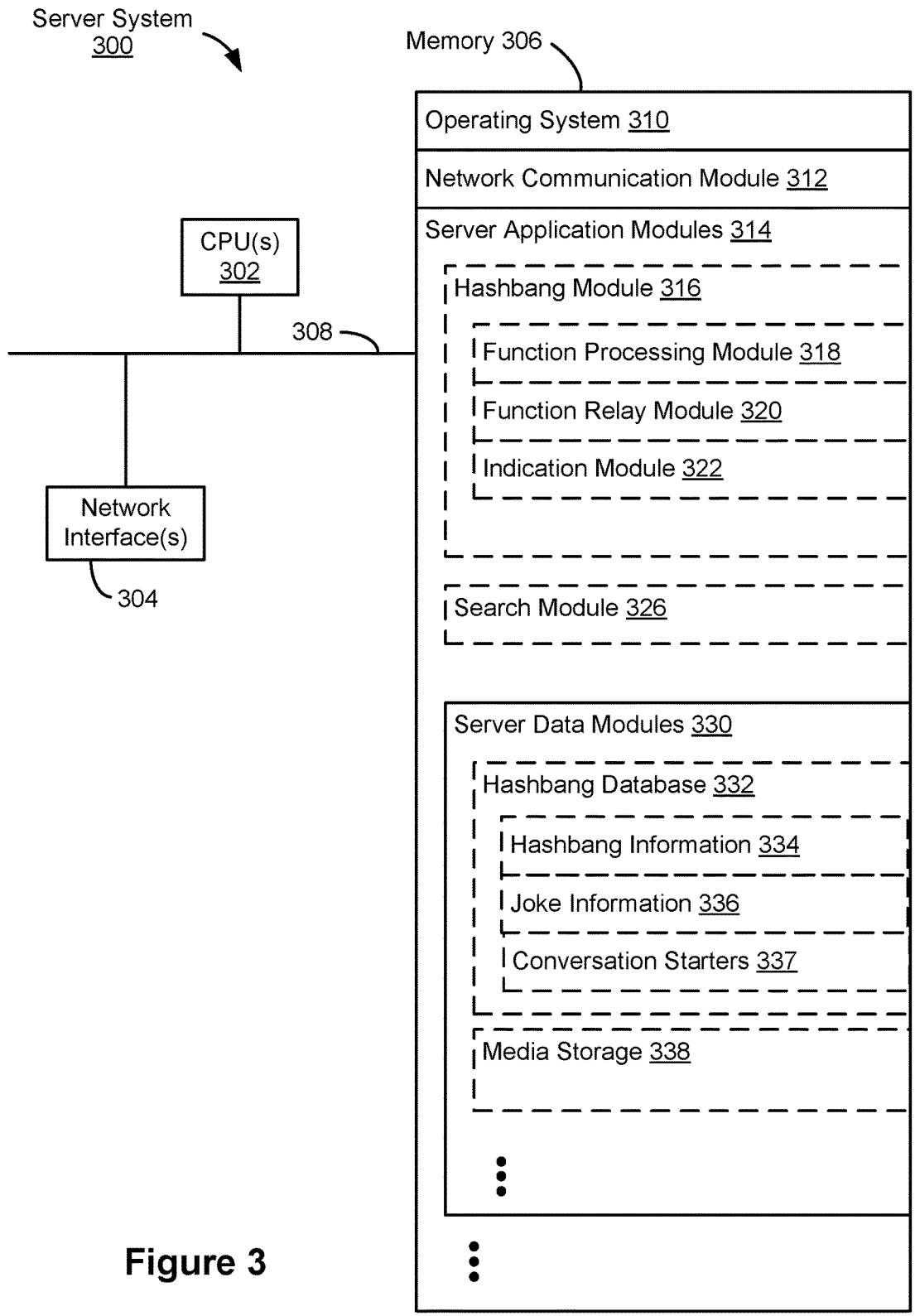
FIG. 3 is a block diagram illustrating an exemplary server system in accordance with some implementations.

FIG. 3 is a block diagram illustrating an exemplary server system 300 (e.g., server 102-1, 102-n, FIG. 1) in accordance with some implementations. The server system 300 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules, and data structures, or a subset or superset thereof:

an operating system 310 that includes procedures for handling various basic system services and for performing hardware dependent tasks;

a network communication module 312 that is used for connecting the server system 300 to other computing devices (e.g., clients 200 (FIG. 2) or other server systems 300) via one or more network interfaces 304 (wired or wireless) connected to one or more networks 112 (FIG. 1) such as the Internet, other WANs, LANs, PANs, MANs, VPNs, peer-to-peer networks, content delivery networks, ad-hoc connections, and so on;

one or more server application modules 314 for enabling the server system 300 to perform various functions, the server application modules 314 including, but not limited to, one or more of:

a hashbang module 316 for receiving and processing functions requested through the specification of pre-defined character strings, in some embodiments comprising:

a function processing module 318, which processes the various functions requested;

a function relay module 320, which relays certain functions another server 102; and an indication module 322, which provides indications of the status or results of functions;

a search module 326, for performing Internet searches;

one or more server data module(s) 330 for handling the storage of and access to content, including but not limited to:
    a hashbang database 334, which contains data related to various functions performed by the hashbang module 316; and
    media storage 338, for storing audio, video, and images;

The optional hashbang module 316 provides functions for receiving and processing requests to execute functions. These requests are generally of the form of a predefined set of characters followed by a keyword specifying the function. In some embodiments, the function relay module 318 processes the functions and generates responses. In some embodiments, the function requires executing a second function on a separate server or service and function relay module 320 communicates with the other server or service, such as though network interfaces 304. In some embodiments, indication module provides indications of the status or the results of functions to clients 200 (FIG. 2).

In some embodiments, search module 326 performs functions related to searching. For example, server module 326 may comprise an internet search engine or a search engine related to specific media sources. In some embodiments, it may comprise an image search engine.

The optional hashbang database 334 stores data associated with hashbang identifiers or functions in one or more types of databases, such as text, graph, dimensional, flat, hierarchical, network, object-oriented, relational, distributed, and/or XML, databases. In some embodiments, hashbang database 334 may be accessed publically. In other embodiments, hashbang database 334 may only be accessed by hashbang module 316 and/or other server application modules 314. In some embodiments, hashbang database 332 contains hashbang information 334, joke information 336, or conversation starters 337, among others.

In some embodiments, hashbang information 334 comprises a list of potential functions that can be executed on the server 300. In addition to providing the hashbang keywords, it may list descriptions of these keywords, syntax, and other information necessary to use them. Hashbang information 334 may also comprise function calls and other information necessary to execute the function. In some embodiments, hashbang information 334 may comprise user access data, allowing hashbang module 316 to restrict access to certain functions to certain users 106.

In some embodiments, joke information 336 is comprised of jokes that may be useful to a user composing a message on a social media system. In some embodiments, joke information 336 may also contain a rating for the jokes based on the respective joke's level of funniness and also based on explicit content. In some embodiments, this may comprise an age restriction.

In some embodiments, conversation starters 337 comprise phrases that may be useful to a user 106 composing an opening message to another user 106. In some embodiments, conversation starters 337 contain meta-data about the phrases to allow them to be properly selected. For example, a certain phrase may be more appropriate when said between two users 106 for whom a social media system has determined to be colleagues, while another phrase may be more appropriate when the social media system has determined that the two users 106 are classmates.

Media storage 338 stores audio, video, and image files for use by the various server modules, including hashbang module 332 and/or search module 326. It may comprise one or more types of databases, such as text, graph, dimensional, flat, hierarchical, network, object-oriented, relational, distributed, and/or XML databases. In some embodiments, media storage 338 may be accessed publically. In other embodiments, media storage 338 may only be accessed by hashbang module 316 and/or other server application modules 314.

The descriptions of media storage 338, hashbang database 332, and the exemplary submodules generally apply to media storage 260 and hashbang database 252 (FIG. 2) and vice-versa.

In some implementations, the server system 102 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Python, Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 300 in accordance with some implementations, FIG. 3 is intended more as a functional description of the various features that may be present in one or more server systems than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the server system 300, and how features are allocated among them, will vary from one implementation to another and, optionally, depends in part on the amount of data traffic that the server system handles during peak usage periods as well as during average usage periods.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Figure 6A:
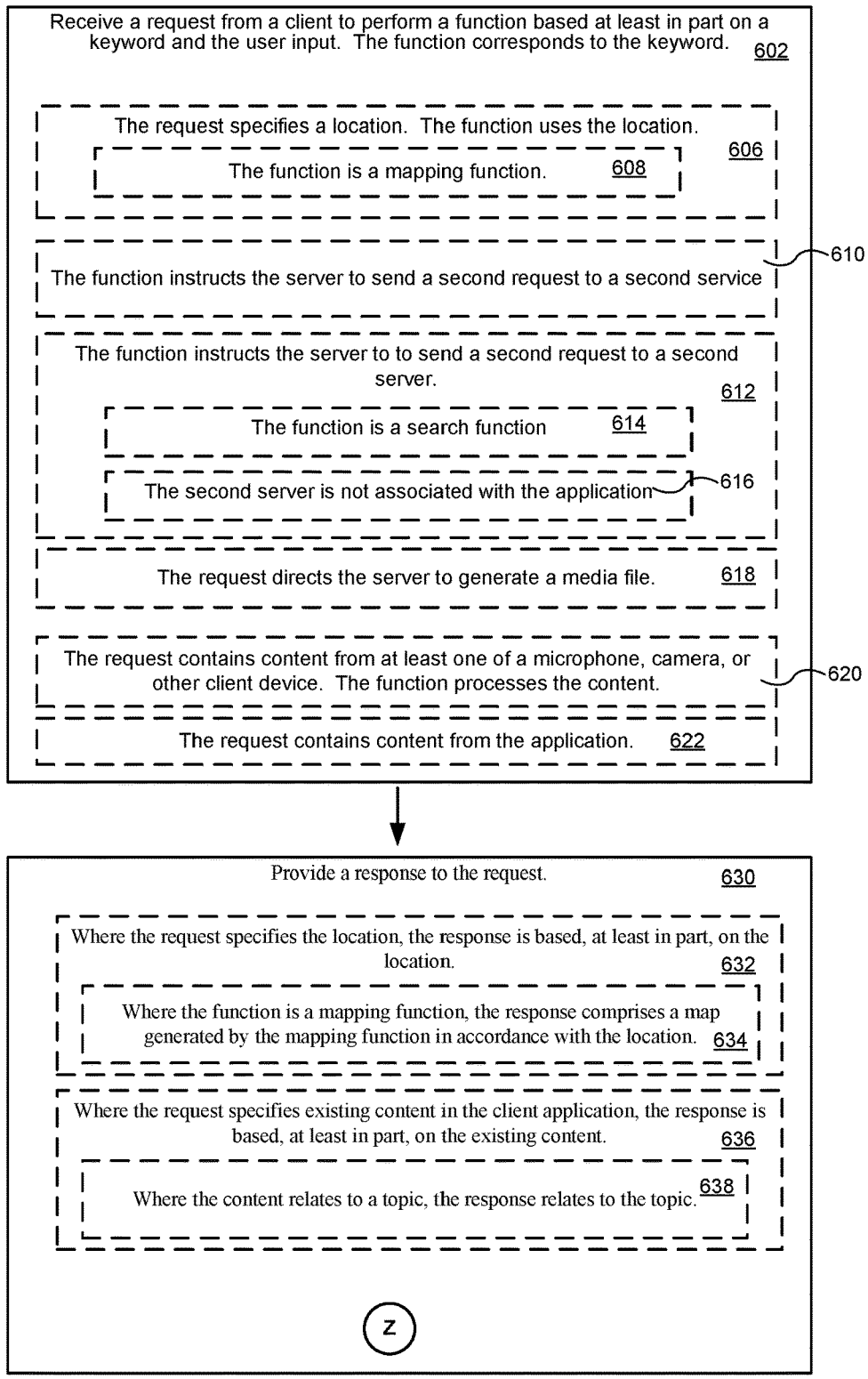
FIGS. 6A-6B illustrate a flow diagram illustrating a method of executing a function on a server based upon a keyword request, in accordance with some implementations.
Figure 6B:
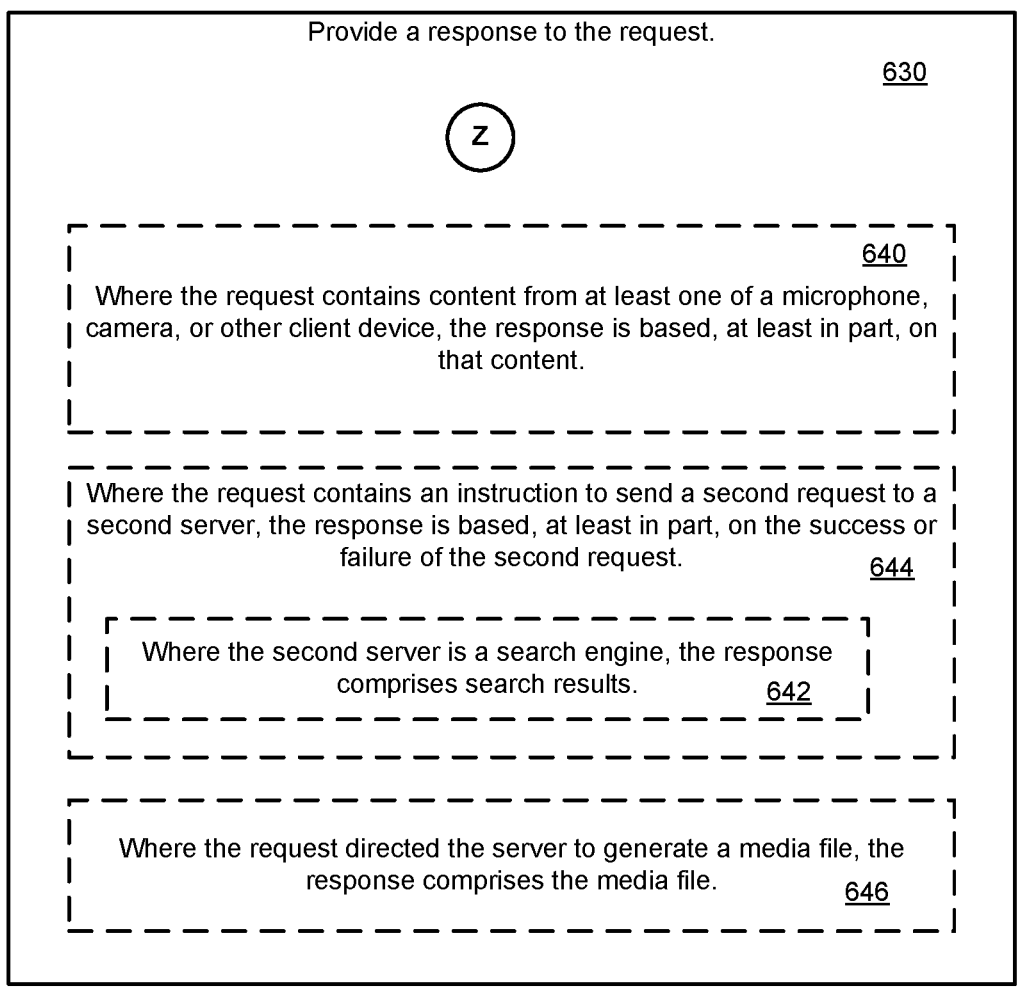

FIGS. 4A-4G illustrate exemplary GUIs on a client 104 (FIG. 1), in accordance with some embodiments. The GUIs in these figures are used to illustrate certain features of the processes described below, including the methods 500 (FIGS. 5A-5E) and 600 (FIGS. 6A-6B). While FIGS. 4A-4G illustrate examples of GUIs, in other embodiments, one or more GUIs display user-interface elements in arrangements distinct from the embodiments of FIGS. 4A-4G. Indeed, only two exemplary functions are illustrated in FIGS. 4A-4G.

Figure 4A:
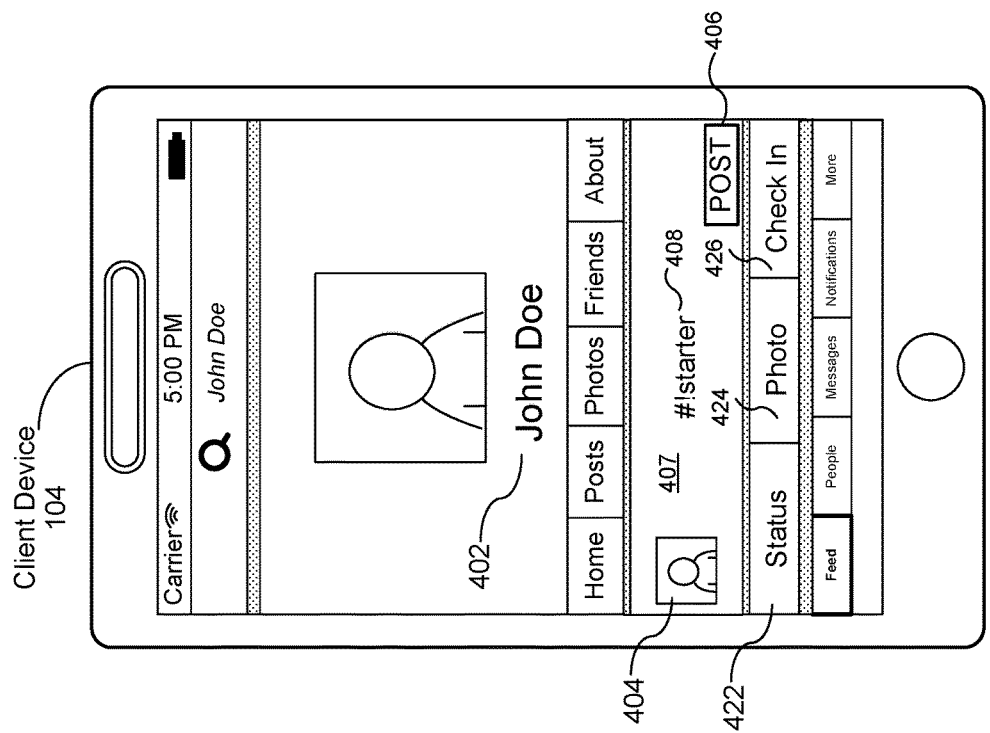
FIGS. 4A-4C illustrate exemplary graphical user interfaces (GUIs) on a client for executing a function while creating an initial post, in accordance with some embodiments.
Figure 4C:
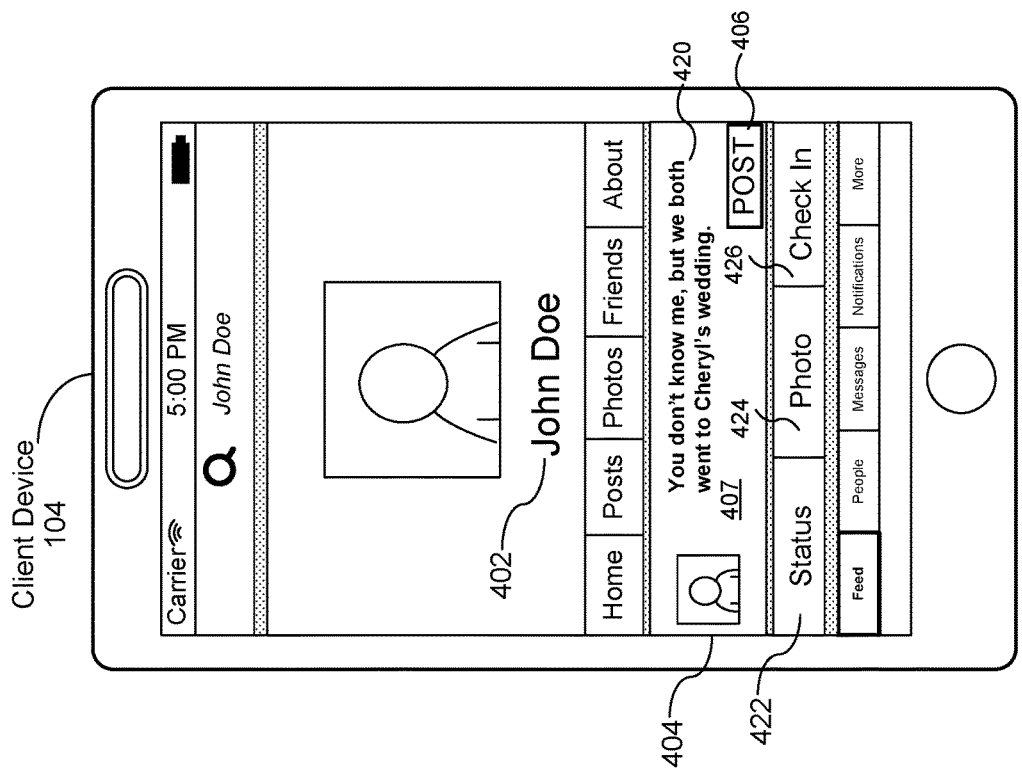
Figure 4B:
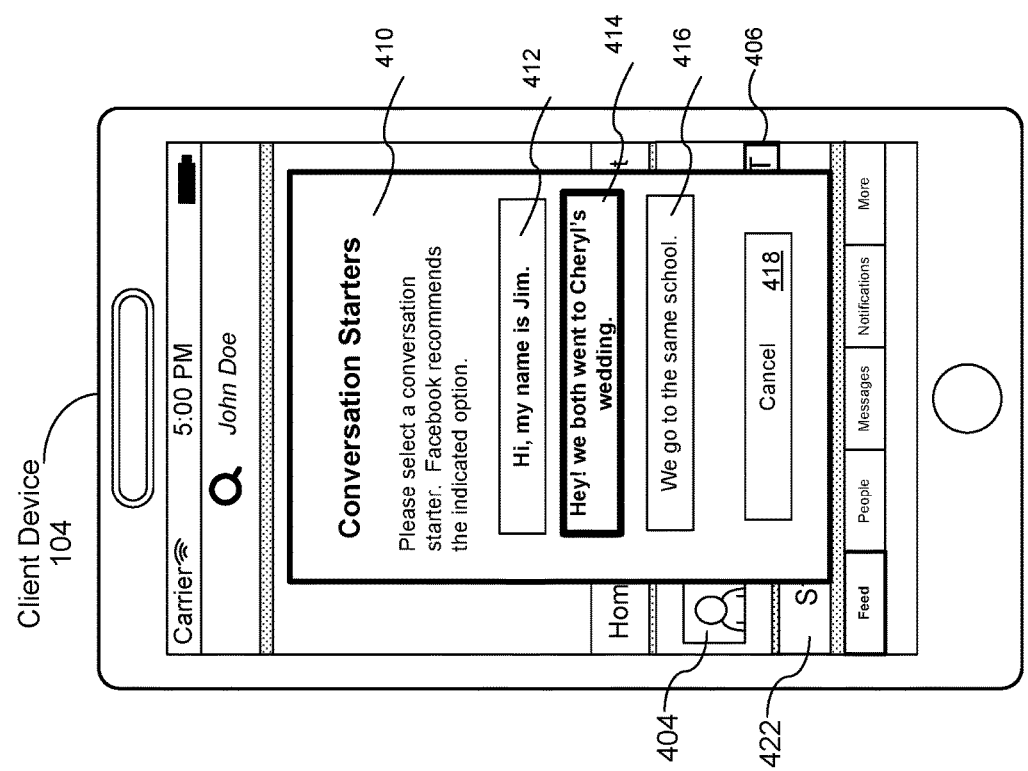

FIGS. 4A-4C illustrate an exemplary hashbang function "#!starter" to generate potential conversation starters. FIG. 4A depicts the homepage of a user of a social media site, John Doe (depicted as 402). (The user 106 using the client device 104 may be a different user from John Doe and is depicted by image 404.) User 106 wishes to start a conversation with John Doe, but does not know how to start. While typing in text field 407, user 106 types a predefined string of characters followed by a keyword 408. While, for simplicity, the character string is referred to as a predefined combination of characters, the combination of characters may, in some embodiments, be only one character. In some embodiments, the predefined combination of characters comprises an emoticon. In some embodiments, it comprises a character from a language other than the language of user 106. In some embodiments, the predefined combination of characters comprises a "character" that does not display on a screen, for example, a control character such as Ctrl-G or Ctrl-K. In some embodiments, there may be more than one predefined combination of characters. In some embodiments, as shown in FIG. 4A, this predefined combination of characters is a "hashbang," or "#!" (i.e., a hash/number sign followed by an exclamation point). For simplicity in describing the FIGS. 4A-4G, the predefined combination of characters will be referred to as a "hashbang," even though any combination of characters could be used. Prior to clicking the post button 406, user 106 specifies the phrase of a hashbang followed by the keyword of "starter" to indicate that the user 106 wishes to retrieve a list of conversation starters.

While FIG. 4A shows field 407 as being a text field, such as a status 422, in some embodiments, text field 407 may comprise a multimedia field containing photos, videos, or other media. For example, if user 106 had clicked on photo 424, field 407 may permit entering of both text and one or more images.

After user 106 types hashbang command 408 (i.e. "#!starter"), character detection module 228 (FIG. 2) will detect that a hashbang function has been requested and will pass the command to hashbang module 232 (FIG. 2). In some embodiments, this is done by parsing every character as it is entered into text field 407. In some embodiments, character detection module 228 may be implemented, at least in part, in JavaScript or ActiveX. In some embodiments, character detection module 228 is a part of social media application module 226. In some embodiments, the user 106 must enter at least one predefined character after the keyword to signal that the hashbang keyword is complete. In some embodiments, the predefined character will be a space. In some embodiments, such as in the example depicted in FIGS. 4D-4G, parameters may be specified in hashbang command 408. Note that the hashbang function will typically be executed prior to clicking post button 406.

As illustrated in FIG. 4B, hashbang module 232 looks up conversation starters and displays one or more conversation starters in user element 410. In some embodiments, as shown in FIG. 4B, user element 410 may be a pop-up box on a client device 104. In some embodiments, it may be a web page or a section on a webpage. In this example, display element 410 provides a list of choices for the user. In some embodiments, for some hashbang commands 408, the choices may be limited to "okay" and "cancel." In the example shown, display element shows a list of potential options, in this case conversation starters 412, 414, and 416. In some embodiments, some or all of the potential options will be loaded from a server. In some embodiments, a recommended list member (e.g., 414) will be provided. A cancel button 418 may also be provided to allow user 106 to exit without choosing any of the conversation starters. In some embodiments, images or video may be displayed, such as on screen 240 (FIG. 2) in addition to or in lieu of text. In some embodiments, audio may be played.

In some embodiments, if user 106 selects cancel 418, the user will be returned to the field 407. In some embodiments, if user 106 clicks on one of the conversation starters 412, 414, or 416, for example conversation starter 414, content associated with that starter may be placed into the text field 407. For example, as shown in FIG. 4C, the text 420 "You don't know me, but we both went to Cheryl's wedding" which corresponds to the text associated with conversation starter 414 is placed into field 407. In some embodiments, as illustrated in FIG. 4C, the content will replace the hashbang 408. In some embodiments, the user 106 will be allowed edit or delete the content in the same manner that the user could edit or delete any other content in field 407. In some embodiments, the user 106 may be permitted to enter another hashbang 408 in field 407. When the user 106 is satisfied with the content in the field 407, the user 106 may click the post button 406 to submit the content in field 407, including the content received from the execution of the hashbang command. For example, in FIG. 4C, if the user 106 clicks post 406, the text 420 corresponding to conversation starter 414, will be submitted to the social media service.

Figure 4E:
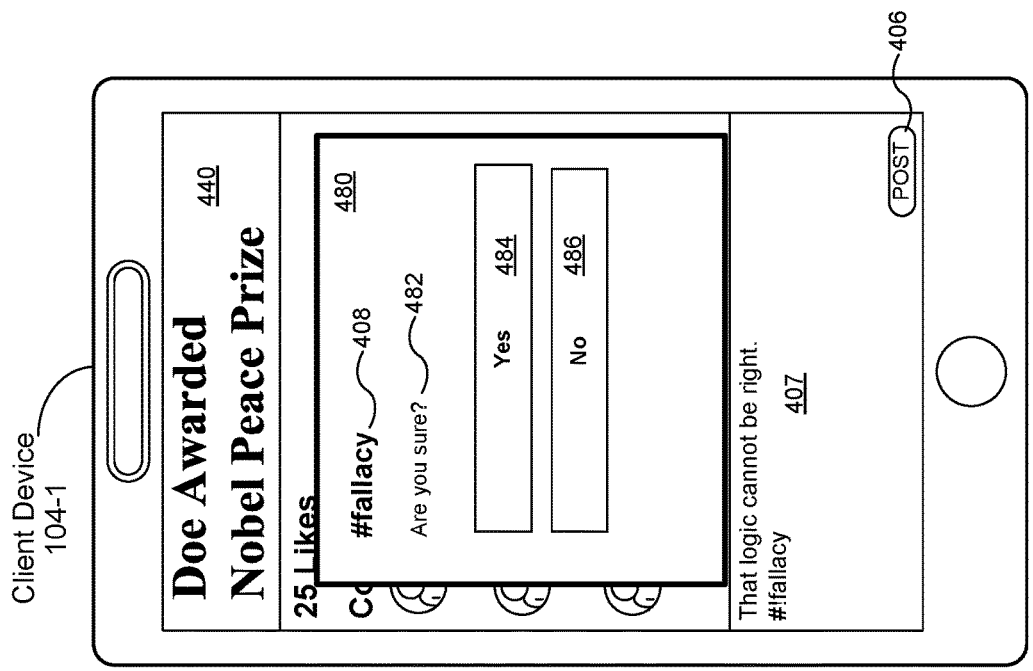
FIGS. 4D-4G illustrate exemplary graphical user interfaces (GUIs) on a client for executing a function while writing a comment, in accordance with some embodiments.
Figure 4D:
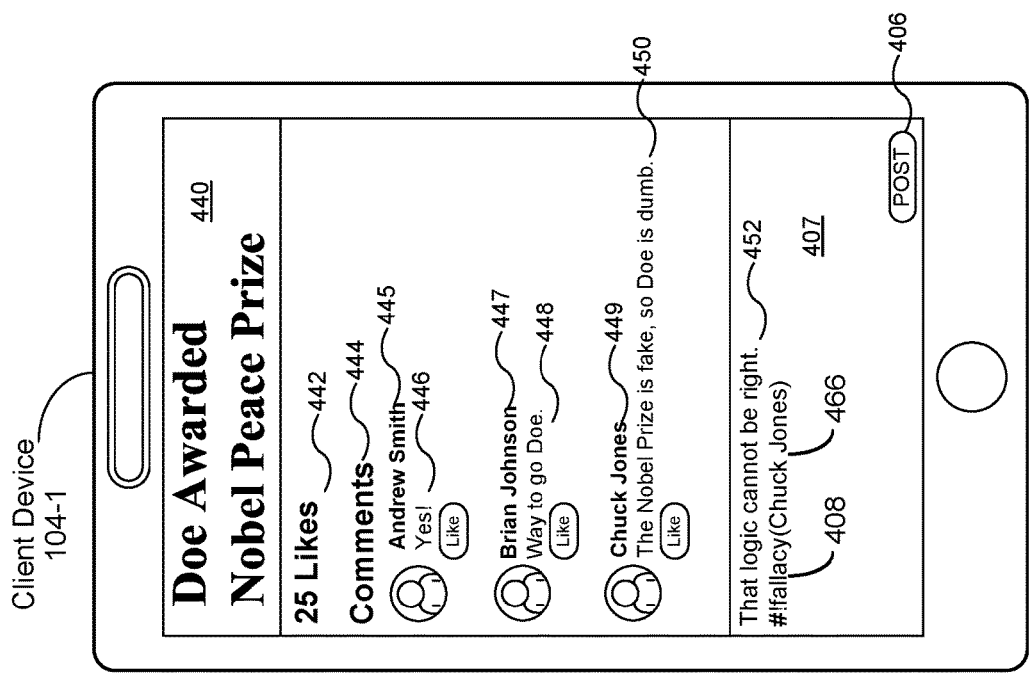

FIG. 4D depicts an exemplary post 440 on a social media service along with comments 446, 448, and 450 related to that post, corresponding to users 445, 447, and 449, respectively. Other elements such as the number of likes 442 are also displayed. User 106 may enter a comment of his or her own 452 into field 407 through the use of, for example, input devices 208 (FIG. 2) on client device 104. In this example, user 106 has already typed some text 452 (i.e., "That logic cannot be right."). Below that text, user 106 has entered exemplary hashbang command 408 "#!fallacy" to provide a list of logical fallacies.

In some embodiments, users 106 may specify one or more parameters 466 for hashbangs 408. These parameters 466 may be identified through inclusion within predefined characters. In some embodiments, as shown in FIG. 4D, these characters may be open-parenthesis and close-parenthesis characters. In some embodiments, parameters can be other users 106 of the social mediate network. For example, as shown in FIG. 4D, user 106 has entered one parameter 466, user "Chuck Jones" as a parameter 466. Once the user 106 enters the hashbang command 408 (and the optional associated parameters), as explained previously with respect to FIG. 4A, the requested hashbang function (i.e., the function corresponding to "#!fallacy") will be executed.

In some embodiments, as illustrated in FIG. 4E, in response to the hashbang function being called, a confirmation display element 480 is displayed on the client's screen. Confirmation display element 480 requests confirmation before executing the hashbang command 408 by asking question 482 and then provides options Yes 484 and No 486. Confirmation display element 480 may be useful when, for example, a user 106 is using a social media application module 226 (FIG. 2) on a client 104 (FIG. 1) that is disconnected from a network (112) and specifies a hashbang command 408 corresponding to a function that requires a server 102. (Functions involving servers are described in detail with respect to FIGS. 5 and 6, below.) In the example illustrated in FIG. 4E, if user 106 selects "no" 486 on confirmation display element 480, the user 106 is returned to text field 407. In this example, if the user 106 selects "yes" 484, the fallacies hashbang command is executed. (The details of execution are described above with respect to FIGS. 4A-4C and below with respect to FIGS. 5 and 6.) In some embodiments, analogous phrases such as "okay" and "cancel" may be used.

In some embodiments, the execution of the hashbang function may take place entirely on the client device 104. But, in some embodiments, the function will send a message corresponding to the keyword to a server 102. Hashbang module 316 (FIG. 3) of server 102 will process the function as described with respect to hashbang module 232 (FIG. 2)

in the example illustrated in FIGS. 4A-4C. For example, in some embodiments, the four options (e.g., fallacies) 458, 460, 462, and 464 displayed in FIG. 4F in response to the fallacy hashbang are loaded by hashbang module 232 (FIG. 2) from hashbang database 252 (FIG. 2). In some embodiments, character detection module 228 (FIG. 2) will identify the predefined characters and keyword (e.g., fallacy) and will send a message to the hashbang module 316 (FIG. 3) on server 102. In some embodiments, character detection module 228 will launch hashbang module 232 which will, in turn, send a message to hashbang module 316 which may perform the function and return the response back to the client 104.

In this example, in addition to the keyword, additional existing information may be processed by hashbang module 252 on client 104 or will be sent to server 102 for processing. For example, text (or graphics) associated with post 440 may be sent, as may content contained in one or more of comments 446, 448, and 450.

Figure 4G:
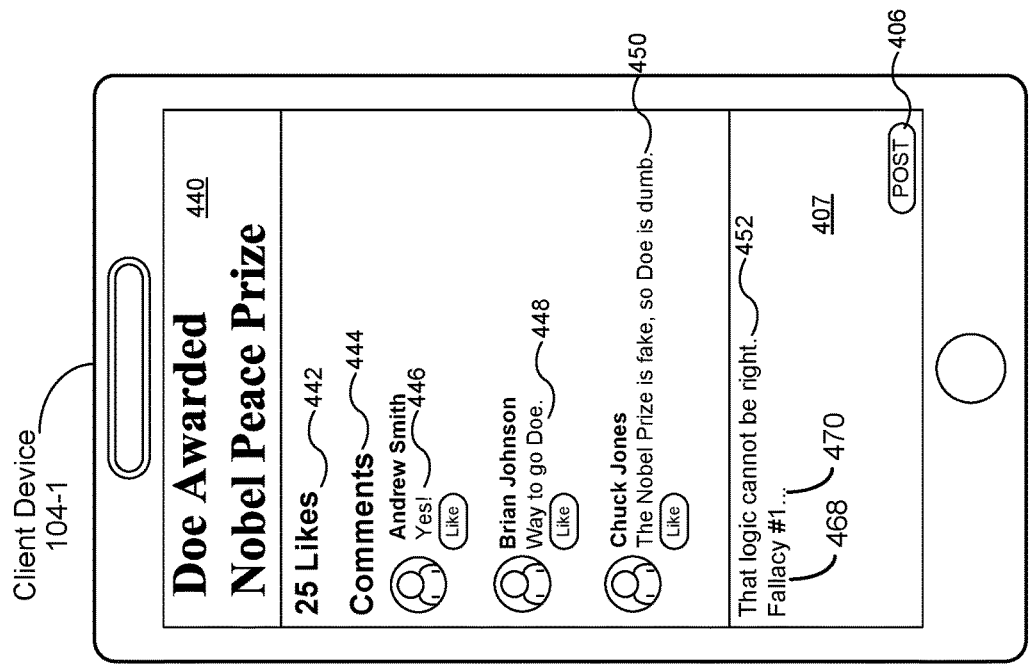

In some embodiments, a preferred option 460 may be indicated. In some embodiments, this indication will be by highlighting the preferred option. As described with respect to FIGS. 4A-4C, in some embodiments, if user 106 selects cancel 418, the user will be returned to field 407. If user 106 selects one of the four options 458, 460, 462, and 464, as shown in FIG. 4G, content associated with the selected option 468 will appear in field 407. In some embodiments, the content will replace the predefined combination of characters and/or the keyword 408. In some embodiments, as shown in this example, existing content 452 will not be modified. In some embodiments, all content 452 in field 407 will be modified or erased. In some embodiments, an ellipses 470 will be displayed after the inserted content to indicate that the user 106 should continue entering content. As discussed with respect to FIG. 4C, once the user 106 is satisfied with the content, the user can select post 406 to submit the content.

While both of the examples shown involve inserting text into the field 407, in some embodiments, the content selected and inserted could be graphical or audible. For example, if user 106 selects photo 424, the content received from the "#!starter" hashbang 408 may comprise pictures. If the user 106 selects check-in 426, the content received from the "starter" hashbang 408 may comprise locations or may be tailored based on a selected location.

Additional examples of potential second functions performed by hashbang module 316 in server 102 may include, in some embodiments, functions to create transcripts of spoken speech, recording/modifying audio/video, processing a message for posting on another server or service, conducting web searches, encryption, decryption, looking up weather forecasts, creating jokes, creating insults, locating relevant news stories, creating translations, etc. Those skilled in the art will recognize additional such functions that are within the scope of the invention. Those skilled in the art will also recognize that some of examples could be performed either by second functions on servers 102 or be entirely performed by a client 104.

FIG. 5 is a flow diagram illustrating a method 500 of executing a function resulting from a predefined combination of characters followed by a keyword.

The steps of the method 500 may be performed by any combination of one or more clients 104 (FIGS. 1 and 2) and/or server systems 102 (FIGS. 1 and 3). FIG. 5 corresponds to instructions stored in computer memory (e.g., memory 212 of the client 104, FIG. 2; memory 306 of the server system 102, FIG. 3; or other computer-readable storage medium. In some embodiments, method 500 may be performed entirely on a client 104.

In some embodiments, in performing the method 500, in step 502, a client displays a field (such as field 407, FIG. 4A) in an application running on the client device. The application may be a web browser, such as a browser module 224, a social media application module 226, or other application.

The client 102 may accept (504) entry of text into the field, where the text includes a predefined combination of characters followed by a keyword. The predefined combination of characters indicates that the keyword corresponds to a function to be performed. In some embodiments, the predefined combination of characters is a hashbang (i.e., "#!"). For simplicity, the predefined combination of characters will be referred to herein as a hashbang, even though it may not necessarily be a "hashbang." Further, for simplicity, a predefined combination of characters followed by a keyword (and any parameters) will be referred to as a "hashbang command."

In some embodiments, in response to the text, the client device 104 will activate (508) at least one of a camera 246 or microphone 248. For example, if an exemplary hashbang command "#!record" to record music (and/or video) was input, a microphone 248 (and/or camera 246) may be activated to record the music and/or video. For another example, if an exemplary hashbang command "#!transcribe" to convert audio into text was input, a microphone 248 may be activated to record the voice to be converted.

In some embodiments, the client sends (510) a message corresponding to the keyword to a first server. In some embodiments, that message contains (512) content from at least one of a camera, microphone, or other device. For example, in the "#!record" and "#!transcribe" examples, audio (and/or video) may be sent to the server. In some embodiments, the message specifies (514) a location. For example, if an exemplary hashbang command "#!nearby" to identify nearby businesses or users was entered, a location may be sent with the command. In some embodiments, the location is specified via parameters. In some embodiments, the location of the client device 104 is used as the location. In some embodiments, the location of the client device is determined using device location module 270 (FIG. 2). In some embodiments, the messages specifies (516) existing content in the application. This information may be used by hashbang module 316 (FIG. 3) to determine the proper action or response. To use the example in FIGS. 4D-4G, existing information related to the previous comments was sent along with the hashbang command "#!fallacy." In this example, the text of Chuck Jones' comment may be sent, allowing hashbang module 316 to scan hashbang database 332 and/or other data sources to determine appropriate logical fallacies to display.

In some embodiments, in response to the message, the client receives (518) a user-interface element from the server. In some embodiments, this may contain text, lists of text, images, lists of images, audio, video, or other content. To use the example in FIGS. 4A-4C, if the user interface element was sent from the server, the user interface element (i.e., 410, FIG. 4B) would be a list of conversation starters. Similarly, in the example in FIGS. 4D-4G, it would be a list of logical fallacies. In the embodiment where the function is a mapping function, the user interface element may be a map or a part of a map.

In some embodiments, the client displays (520) the user-interface element based on the text. The user-interface element requests user input regarding the function. Sometimes, the user interface element requests (522) user selection of content. For example, in FIG. 4B, the user interface element comprises three potential conversation starters 412, 414, and 416, and requests the user 106 to choose one of them. For another example, in FIG. 4F, the user-interface element 456 comprises four logical fallacies 456,460, 462, and 464 and requests the user 106 choose one. In some embodiments, the user-interface element will recommend a particular selection. In some embodiments, the user element will contain an option to cancel the hashbang function. In some embodiments, this may be done using a cancel button, such as cancel button 418 in FIG. 4F.

The client device 104 receives (524) the user input. In some embodiments, the user selects (526) the content to be used as the user input. In some embodiments, the user input may be as simple as a confirmation button. For example, as shown in display element 480 (FIG. 4E), the user 106 is provided two options, yes 484 and no 486 and may choose between them. In some embodiments, the user input may be in the form of text or pictures or audio or video. For example, a user interface element in response to a "#!transcribe" hashbang command 408 to transcribe an audio or video recording, a user interface element may have buttons to record audio or video, such as from a camera 246 (FIG. 2) or a microphone 248 (FIG. 2), and/or to play audio or video back to the user 106.

Next, the function is performed (530) in accordance with the user input. In some embodiments, this may be done on client 104, and in some embodiments, it may be done on server 102. In some embodiments, the performance may be split between the client 104 and a server 102. In some embodiments, multiple servers 102 are used. In some embodiments, performing the function updates (532) the field (e.g, text field 407, FIG. 4A), at least in part based on the user input. In some embodiments, the client displays (534) the selected content in the field. Nonlimiting examples of this are given in FIGS. 4B and 4F.

In some embodiments, the client 106 sends (536) a first request from the client device 106 to a first server 102 to perform a second function, based, at least in part, on the keyword and the user input. Similar to the first function, the second function corresponds to the keyword. In some embodiments, the first request specifies (538) a location and the second function will use the location. In some embodiments, the second function is a mapping function (540). In some embodiments, the client device 104 submits (542) content from the at least one of a camera 246 or a microphone 248 of the client device 104, and the second function processes the content. In some embodiments, this content may comprise "live" content taken by the camera 246 and/or microphone 248 after the user 106 entered the hashbang command. In some embodiments, this content may comprise prerecorded audio and/or video.

In some embodiments, the first request specifies (544) existing content in the application and the second function processes the content. For example, in FIG. 4D, user 106 entered a "#!fallacy" hashbang command 408 in field 407 as a part of a comment on post 440 which already contains content. The first request may comprise content already in the field 407, such as the user's statement that "that logic cannot be right" 452. The first request may also comprise content from a post 440 being commented upon or earlier comments 446, 448, and 450 on the post. In some embodiments, the existing content relates (546) to a topic. In some embodiments, the existing content relates to a user or page on a social media service.

In some embodiments, the first request instructs (548) the service (a "first service") on the first server to send a second request to a second service. The client application (e.g., social media application module 226 or a webpage on browser module 224) may be associated with the first service. For example, execution of an exemplary "#!post" hashbang command 408 to post content to another service, may result in hashbang module 316 on server 102 sending a message to the other service. In some embodiments, these services are on the same server. Similarly, in some embodiments, the first request instructs (550) the first server to send a second request to a second server 102. This is analogous to step 548, except that the second service is located on a separate server. Accordingly, in this example, the hashbang module 316 on the first server 102 may use network interface(s) 304 to communicate with the second sever 102 via a network 112. Sometimes, the application is not associated with the second server (552). In some embodiments, the second server comprises a search engine (554). For example, for an exemplary "#!snopes" hashbang command to search for Snopes (a popular service providing content related to the truth or falsity of assertions) content related to a topic, the second server may be a server operated by Snopes. The server may also be an Internet search engine, such as ones provided by Google, Bing, Yahoo!, etc., configured to search for Snopes articles.

In some embodiments, the first request directs (560) the server 102 to generate a media file. For example, an exemplary "#!meme" hashbang command 408 to create a "meme" (a popular image type, often consisting of a picture and one or more textual phrases) may cause hashbang module 316 (FIG. 3) to load an image, such as from media storage 338, and combine it with text to create a meme. For another example, an exemplary "#!imagesearch" hashbang command 408 may direct the server to locate and return an image corresponding to a specified parameter to the hashbang command 408.

In some embodiments, the client 104 receives (570) a response to the first request from the first server 102. The format of this response may vary depending on the type of request. For example, in the exemplary "#!fallacy" or "#!starter" hashbang commands discussed above, the response may comprise a list of text strings. Such a response may also include a recommended one of the text strings. Where the first request specified existing content, the response may be based, at least in part, on the existing content (572). Where the existing content relates (574) to a topic, the response may include information pertaining to that topic. Where the second function uses a location (whether specified by the user 106 in a parameter to hashbang command 408, obtained based on characteristics of the client device 104, such as through device location module 270 (FIG. 2), or otherwise obtained), the response may be based, at least in part, on location (576). For example, where the second function is a mapping function, the response may include (578) a map generated by the mapping function in accordance with the location. Other exemplary location-based hashbang commands may include commands to locate nearby businesses and/or users, display weather forecasts, etc. Where the first request directs the first server to generate a media file, the response comprises (580) the media file. For example, in the exemplary "#!meme" or "#!imagesearch" hashbang commands discussed above, the response may comprise an image. Where the second function processes content from at least one of the camera 246 or microphone 248, the response may be based, at least in part, on the content (584). In some embodiments, the content comprises (586) audio or video content.

Where the second function directs the first server 102 to send a second request to a second server 102 (or a second service on the first server 102), the response may be based, at least in part, on whether the second request succeeded or failed (558). For example, for an exemplary hashbang command "#!search" to query a search engine, the response may include search results (558).

Figure 4F:
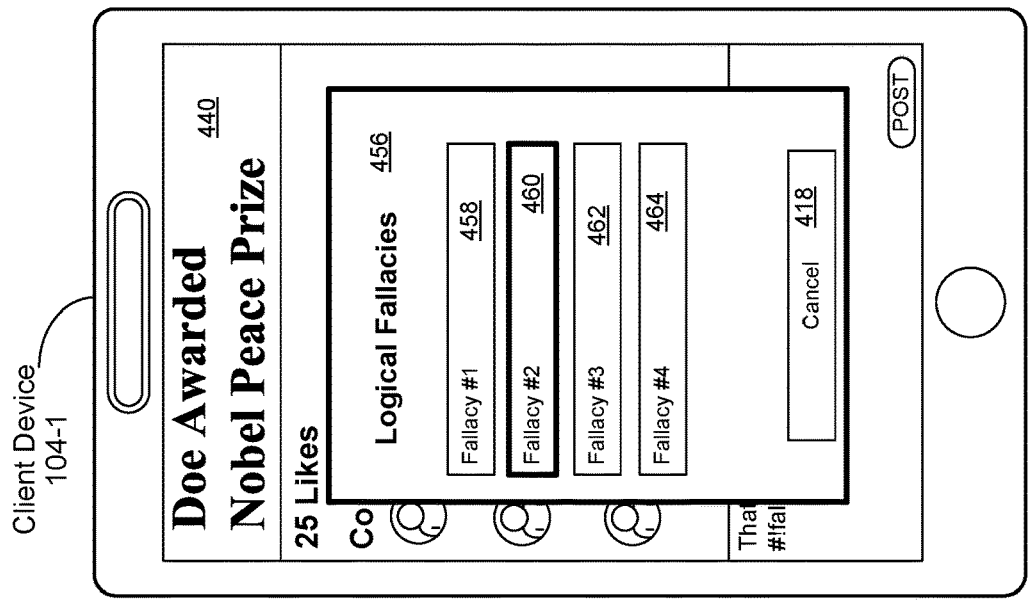
Figure 5A:
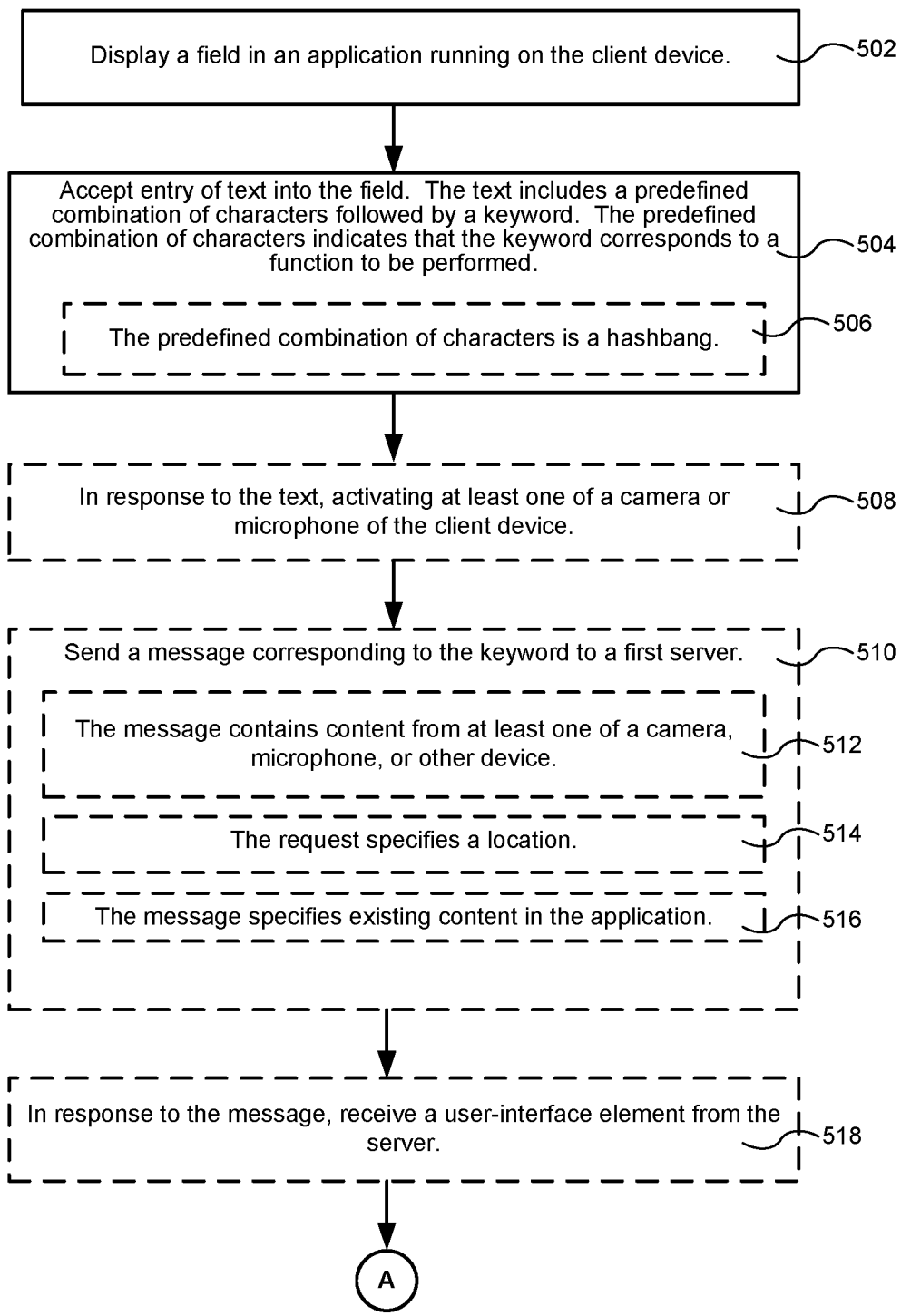
FIGS. 5A-5E illustrate a flow diagram illustrating a method of executing a function on a client device while the device is performing a writing task.
Figure 5B:
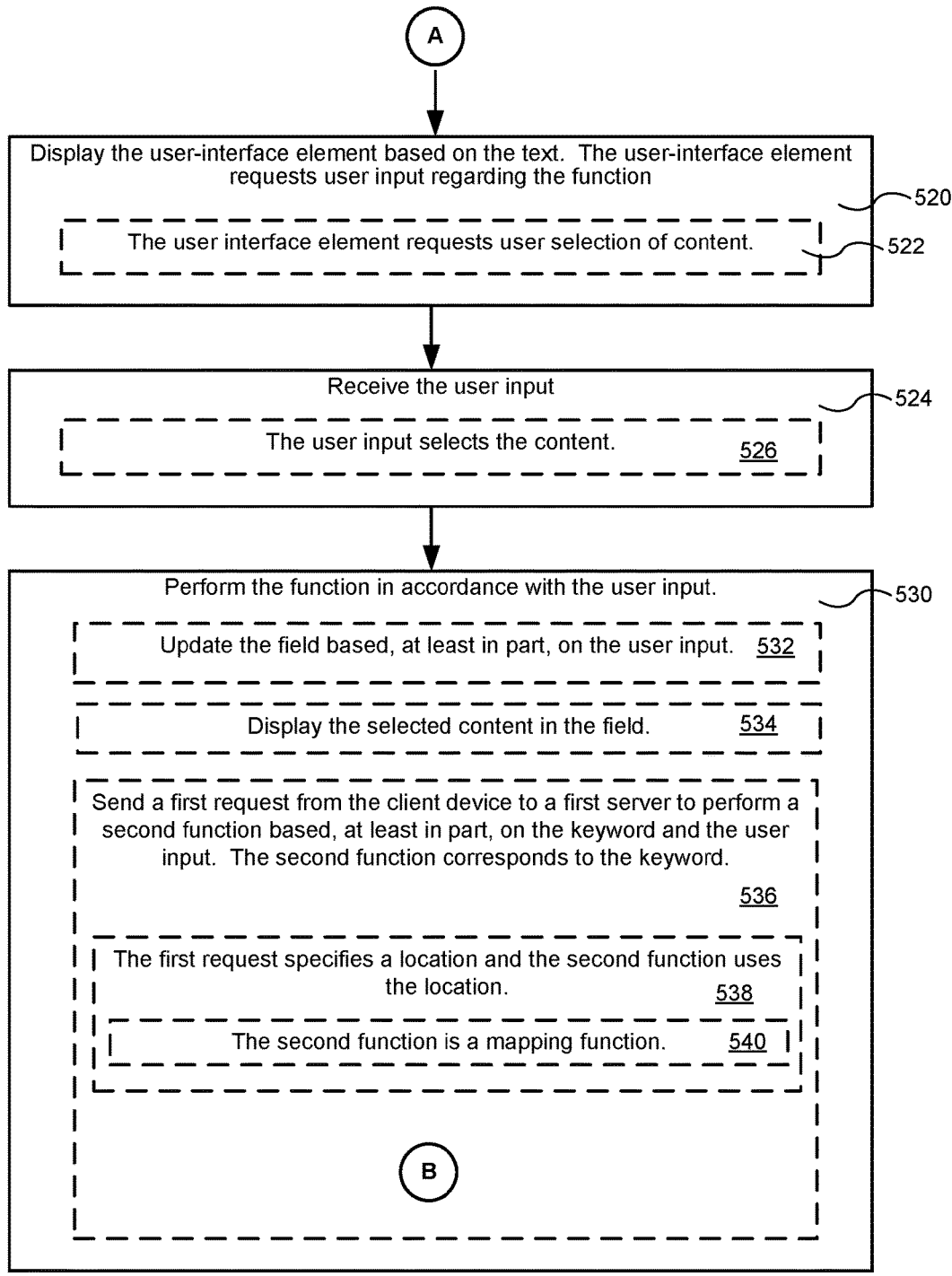
Figure 5C:
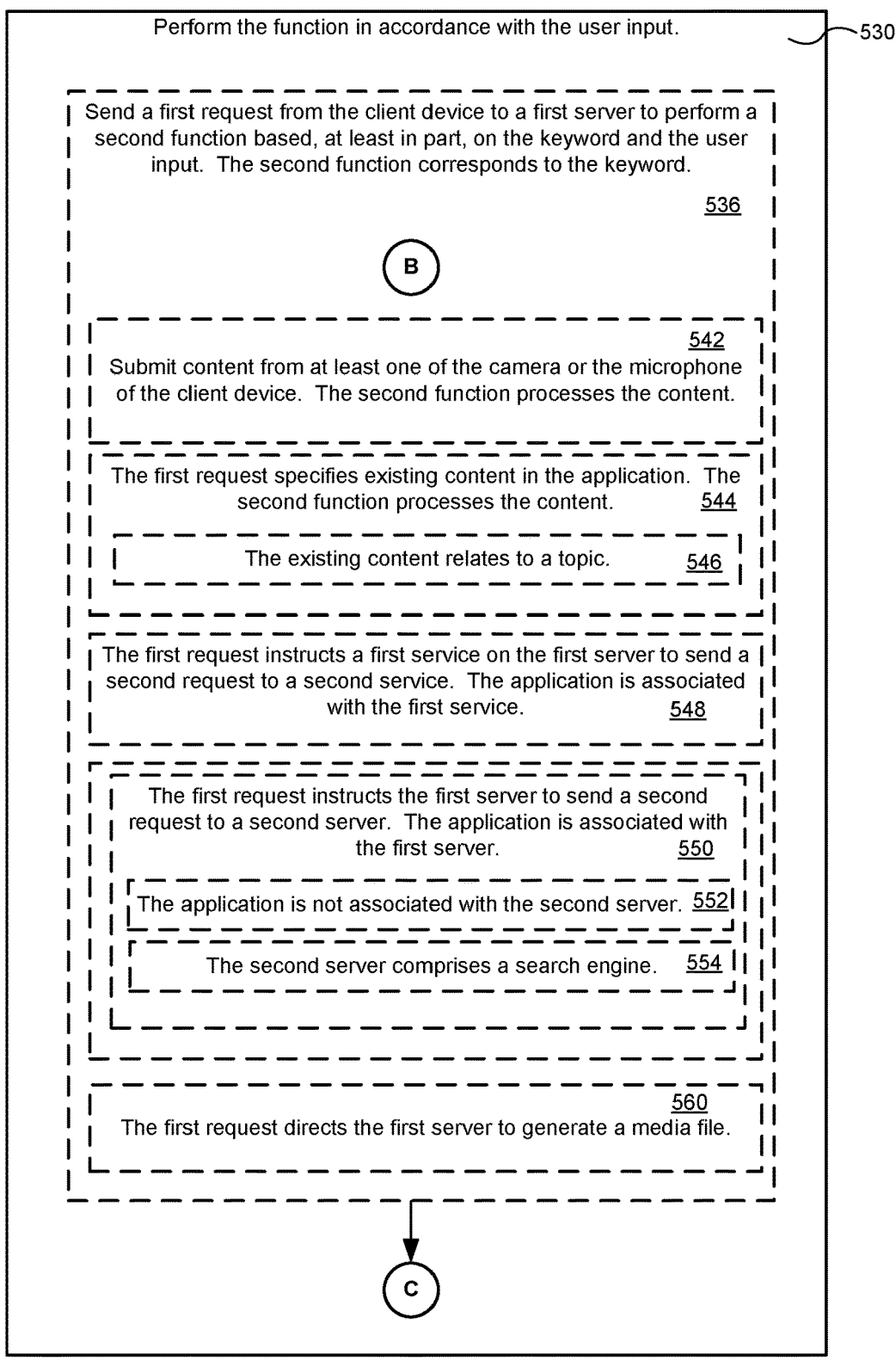
Figure 5D:
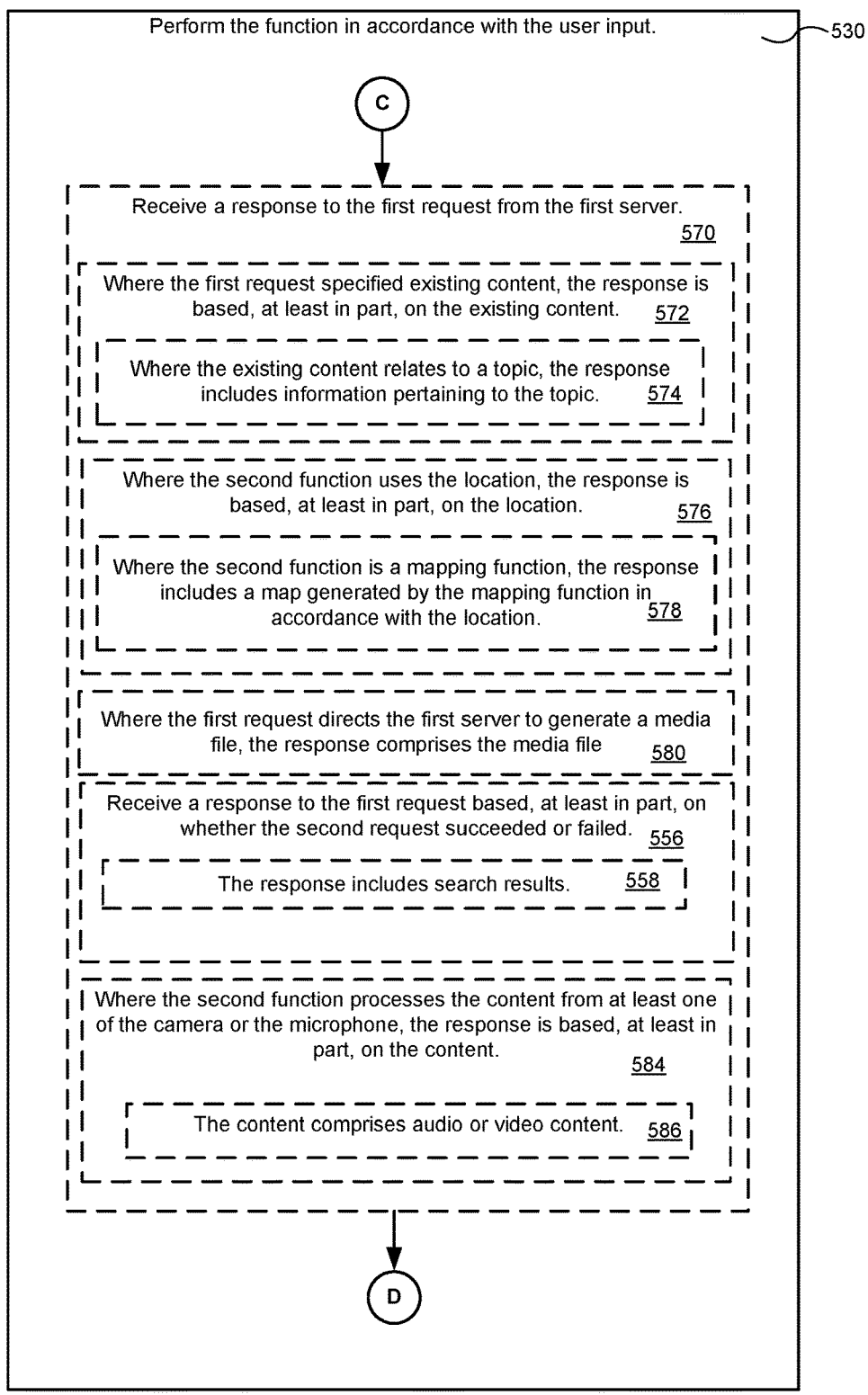
Figure 5E:
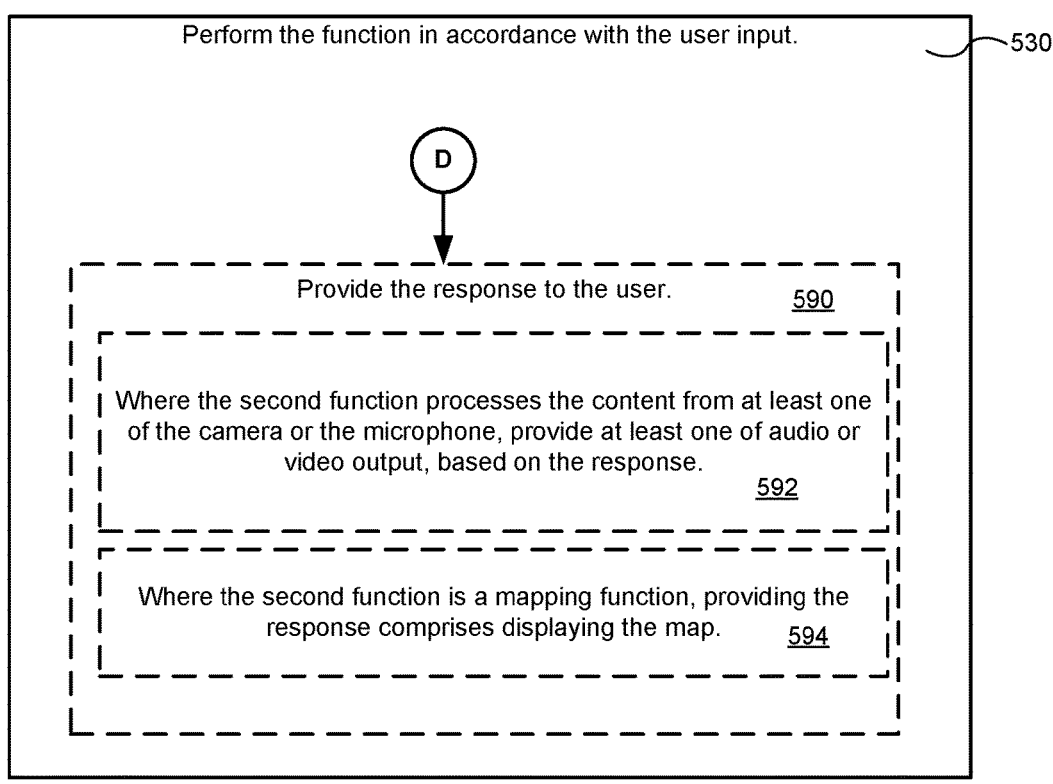

In some embodiments, the client 104 provides (590) the response to the user 106. The format of this response may vary depending, in part, on the hashbang command 408. For example, as shown in FIGS. 4B and 4F, the format may be user element 410 (FIG. 4B) or 456 (FIG. 4F) containing a list of possible options. As shown in those examples, those options may be textual in nature. In other embodiments, providing the response to the user 106 may comprise displaying one or more images or video on screen 240 and/or playing audio on an output device 206, such as speakers. For example, where the second function processes the content from at least one of the camera 246 or microphone 248, the client 104 provides (592) at least one or audio or video output, based on the response. Similarly, where the second function is a mapping function, the client may provide (594) a map.

FIG. 6 is a flow diagram illustrating a method 600 of executing a function resulting from a predefined combination of characters followed by a keyword.

The steps of the method 600 may be performed by any combination of one or more server systems 102 (FIGS. 1 and 3). FIG. 6 corresponds to instructions stored in computer memory (e.g., memory 306 of the server system 102, FIG. 3; or other computer-readable storage medium.

In some embodiments, in performing the method 600, in step 602, a server 102 receives a request from a client 104 to perform a function based, at least in part, on a keyword and user input. The function corresponds to the keyword. This is described in more detail with respect to FIG. 5 (e.g., step 536), above. In some embodiments, as described above with respect to steps 538 and 540 (FIG. 5), the request specifies (606) a location and the function uses the location. Sometimes, the function is a mapping function 608 and the function generates a map.

In some embodiments, as described above with respect to steps 550, 552, and 554 (FIG. 5), sometimes the function instructs the server 102 to send (612) a second request to a second server 102. Similarly, sometimes the function instructs the server 102 to send (610) a second request to a second service on the server 102. Sometimes, as described above with respect to step 554, the function may be a search function and second server 102 may be a search engine. Sometimes, the second server 102 is not associated with the application (616).

In some embodiments, as described above with respect to step 560 (FIG. 5), sometimes the request directs (618) the server to generate a media file. In some embodiments, as described above with respect to step 560 (FIG. 5), sometimes the request contains (620) content from at least one of a microphone 248, camera 246, or other client device, such as another input device 208 and the function processes the content. In some embodiments, as described above with respect to steps 544 and 546 (FIG. 5), sometimes the request contains (622) content from the application on the client 102.

In some embodiments, as described above with respect to step 570 (FIG. 5), the server 102 will provide (630) a response to the request. As described above with respect to step 576 and 578 (FIG. 5), where the request specifies a location, the response is based, at least in part, on that location (632). For example, as described above with respect to step 578, where the function is a mapping function, the response may comprise (634) a map generated by the mapping function in accordance with the location. In some embodiments, as described above with respect to steps 572 and 574 (FIG. 5), where the request specifies existing content in the client application, the response may be based, at least in part, on the existing content (636). For example, as described above with respect to step 574, where the content relates to a topic, the response may relate (638) to the topic. As described above with respect to step 560 (FIG. 5), where the request directs the server 102 to generate a media file, the response may comprise (646) the media file.

As described above with respect to steps 584 and 586 (FIG. 5), where the request contains content from at least one of a microphone 248, camera 246, or other client device, the response may be based, at least in part, on that content (640). As described above with respect to steps 548, 550, 552, and/or 554 (FIG. 5), where the request contains an instruction to send a second request to a second server 102 (or a second service on the first server 102), the response may be based, at least in part, on the success or failure of the second request (644). For example, as described above with respect to step 554, where the second server is a search engine the response may comprise (642) search results.

In some embodiments, the method 600 is performed in conjunction with method 500. For example, as discussed with respect to step 536 of FIG. 5, a client 104 may send a first request to a first server 102 to perform a second function. In some embodiments, the second function is the function referenced in step 602 (FIG. 6).

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising: at a client device having one or more processors and memory storing instructions for execution by the one or more processors:
   displaying a data entry field in an application running on the client device;
   receiving, in the data entry field, a first user entry that includes first text, and in response to receiving the first user entry, displaying the first text in the data entry field;
   receiving, in the data entry field, a second user entry comprising a concatenation of a predefined combination of characters followed by a keyword related to a topic, the second user entry being different from the first user entry;

in response to receiving the second user entry, displaying a user-interface element based on the second user entry, including presenting a plurality of options to the user, wherein each option of the plurality of options corresponds to the keyword and includes information pertaining to the topic;

receiving a user selection of a first option of the plurality of options; and in response to the user selection of the first option, replacing the second user entry with content corresponding to the first option within the data entry field.

2. The method of claim 1, wherein the predefined combination of characters is a hashbang ("#!").

3. The method of claim 1, further comprising:
in response to receiving the second user entry in the data entry field, sending a message corresponding to the keyword to a server; and
in response to the message, receiving the user-interface element from the server.

4. The method of claim 1, further comprising:
sending a first request from the client device to a first server to generate the plurality of options based at least in part on the keyword.

5. The method of claim 4, further comprising:
receiving, at the client device, the plurality of options from the first server; and
providing the plurality of options to the user.

6. The method of claim 1, wherein:
the keyword specifies a location; and
the plurality of options that is presented to the user is based, at least in part, on the location.

7. The method of claim 6, wherein:
the plurality of options that is presented to the user includes one or more maps generated by a mapping function in accordance with the location; and
inserting content comprises displaying a map of the one or more maps.

8. The method of claim 1, wherein
the plurality of options that is presented to the user includes at least one of audio and video; and
inserting content comprises providing at least one of audio and video output.

9. The method of claim 5, wherein:
the plurality of options includes existing content in the application.

10. The method of claim 4, further comprising:
in response to receiving the second user entry, sending a first request from the client device to a first server, wherein:
the first request instructs the first server to send a second request to a second server; and
the application is associated with the first server.

11. The method of claim 10, wherein the application is not associated with the second server.

12. The method of claim 10, wherein an option of the plurality of options is based, at least in part, on whether the second request succeeded or failed.

13. The method of claim 12, wherein:
the second server comprises a search engine; and
the plurality of options includes search results.

14. A client device, comprising:
one or more processors; and
memory storing one or more programs for execution by the one or more processors, the one or more programs including instructions for:
displaying a data entry field;
receiving, in the data entry field, a first user entry that includes first text, and in response to receiving the first user entry, displaying the first text in the data entry field;
receiving, in the data entry field, a second user entry comprising a concatenation of a predefined combination of characters followed by a keyword related to a topic, the second user entry being different from the first user entry;
in response to receiving the second user entry, displaying a user-interface element based on the second user entry, including presenting a plurality of options to the user, wherein each option of the plurality of options corresponds to the keyword and includes information pertaining to the topic;
receiving a user selection of a first option of the plurality of options; and
in response to the user selection of the first option, replacing the second user entry with content corresponding to the first option within the data entry field.

15. A non-transitory computer-readable storage medium storing one or more programs configured for execution by one or more processors, the one or more programs including instructions for:
displaying a data entry field;
receiving, in the data entry field, a first user entry that includes first text, and in response to receiving the first user entry, displaying the first text in the data entry field;
receiving, in the data entry field, a second user entry comprising a concatenation of a predefined combination of characters followed by a keyword related to a topic, the second user entry being different from the first user entry;
in response to receiving the second user entry, displaying a user-interface element based on the second user entry, including presenting a plurality of options to the user, wherein each option of the plurality of options corresponds to the keyword and includes information pertaining to the topic;
receiving a user selection of a first option of the plurality of options; and
in response to the user selection of the first option, replacing the second user entry with content corresponding to the first option within the data entry field.

* * * * *